(12) United States Patent
Hänninen et al.

(10) Patent No.: US 11,774,749 B2
(45) Date of Patent: Oct. 3, 2023

(54) SYSTEM FOR PROTECTING AN OPTICAL SYSTEM

(71) Applicant: Vaisala Oyj, Vantaa (FI)

(72) Inventors: Tuomo Hänninen, Helsinki (FI); Kimmo Kynnös, Helsinki (FI); Hanna Kuivala, Helsinki (FI)

(73) Assignee: Vaisala Oyj, Vantaa (FI)

( * ) Notice: Subject to any disclaimer, the term of this patent is extended or adjusted under 35 U.S.C. 154(b) by 446 days.

(21) Appl. No.: 16/544,976

(22) Filed: Aug. 20, 2019

(65) Prior Publication Data

US 2020/0073116 A1 Mar. 5, 2020

(30) Foreign Application Priority Data

Aug. 31, 2018 (FI) ..................................... 20185728

(51) Int. Cl.
| | | |
|---|---|---|
| *G02B 27/00* | (2006.01) | |
| *G02B 6/38* | (2006.01) | |
| *F21V 8/00* | (2006.01) | |
| *G08G 1/0967* | (2006.01) | |

(52) U.S. Cl.
CPC ....... *G02B 27/0006* (2013.01); *G02B 6/3873* (2013.01); *G02B 6/001* (2013.01); *G08G 1/0967* (2013.01)

(58) Field of Classification Search
CPC .. B60Q 1/0005; B60Q 1/2661; B60Q 1/0017; B60Q 1/105; G02B 27/00; G02B 6/38; F21V 8/00
See application file for complete search history.

(56) References Cited

U.S. PATENT DOCUMENTS

| | | |
|---|---|---|
| 2,896,854 A | 7/1959 | Noble et al. |
| 3,310,356 A | 3/1967 | Willy |
| 4,521,089 A | 6/1985 | Bohl et al. |
| 5,115,342 A | 5/1992 | Rowe et al. |
| 7,866,850 B2 * | 1/2011 | Alexander .............. F21V 29/83 362/294 |
| 2011/0193960 A1 | 8/2011 | Endo et al. |
| 2012/0070142 A1* | 3/2012 | Tregnago ................ B60R 11/04 396/419 |
| 2015/0251227 A1 | 9/2015 | Koelmer |
| 2018/0093644 A1 | 4/2018 | Lin et al. |

FOREIGN PATENT DOCUMENTS

| | | |
|---|---|---|
| DE | 4022085 A1 | 1/1992 |
| DE | 102008008567 A1 | 8/2009 |
| GB | 1039955 A | 8/1966 |
| JP | S56168619 A | 12/1981 |
| JP | 2004333534 A | 11/2004 |
| WO | WO2006104180 A1 | 10/2006 |

* cited by examiner

*Primary Examiner* — William J Carter
(74) *Attorney, Agent, or Firm* — Laine IP Oy

(57) ABSTRACT

According to an example aspect of the present invention, there is provided a system for protecting an optical system, the system comprising a hollow first part having at least one first opening, a hollow second part arranged at least partially within the first part, and a coupling section configured to be coupled to the optical system, wherein the system is configured to guide at least a part of an incoming air flow from the at least one first opening along a flow channel between an inner surface of the first part and an outer surface of the second part.

11 Claims, 8 Drawing Sheets

SYSTEM FOR PROTECTING AN OPTICAL SYSTEM

FIELD

The present invention relates to a system for protecting an optical system.

BACKGROUND

Optical systems which are located in an outdoor environment may be exposed to contamination, for example caused by water, ice or other material particles. Examples of an optical system are a camera and a measurement system such as a road condition monitoring system.

Known road condition monitoring systems are capable of providing data relating to real-time roadway condition information. The systems are related to monitoring and maintenance of transportation infrastructure, such as highways, city streets, back roads and runways. The systems may be also used to allow evaluation and analysis to improve repair response time and facilitate accurate prediction of roadway breakdown.

The road condition monitoring systems are typically attached to vehicles and used during movement of the vehicles. Normally, the road condition monitoring systems are used at least during the winter season. Various parameters such as a water layer thickness, an ice layer thickness, a surface temperature, and a dew point temperature may be measured or evaluated by the road condition monitoring systems.

The optical measurement systems, in particular the lenses of such road condition monitoring systems, are typically protected in order to avoid contamination which would influence the measurement result. A tube may be coupled to the optical measurement system as a protector, for instance. Such a solution is e.g. known from the Teconer Road Condition Monitor RCM411™.

A problem of the use of a tube for protecting an optical measurement system is that particles in an incoming air flow may enter the tube due to a vortex below and within the cavity of the tube. Consequently, known tubes are relatively long in order to reduce or eliminate the effects of the turbulent flow within the tube.

In view of the foregoing, it would be beneficial to provide a system for protecting an optical system, wherein contamination of a window or lens of the optical system can be eliminated or at least reduced. The system should be capable of being manufactured in industrial scale.

SUMMARY OF THE INVENTION

The invention is defined by the features of the independent claims. Some specific embodiments are defined in the dependent claims.

According to an aspect of the present invention, there is provided a system for protecting an optical system, the system comprising a hollow first part having at least one first opening, a hollow second part arranged at least partially within the first part, and a coupling section configured to be coupled to the optical system, wherein the system is configured to guide at least a part of an incoming air flow from the at least one first opening along a flow channel between an inner surface of the first part and an outer surface of the second part.

Various embodiments of the aforementioned aspect may comprise at least one feature from the following bulleted list:

- the first part comprises eight first openings
- a plurality of first openings is arranged circumferentially around the first part
- the first openings have identical dimensions
- at least one of the first part and the second part is in the form of a tube
- a length of the first part is greater than a length of the second part
- a first end of the second part is connected to the first part
- a second end of the second part is arranged at a different level than an end of the first part
- the second part comprises a cover having at least one second opening
- the second part comprises a cover having four second openings
- the cover is arranged at the first end of the second part
- at least one protrusion extends from the cover into a cavity of the second part
- the at least one first opening has a length in the range between 40 mm-80 mm, for example 55 mm
- the at least one first opening has a width in the range between 10 mm-30 mm, for example 20 mm
- the system is made of one single piece
- the system is made of several pieces
- the system is made of thermoplastic polyurethane (TPU) or thermoplastic elastomers (TPE)
- at least one of the first part and the second part is made of a flexible material
- at least a part of the system is made of a flexible material
- at least one of the first part and the second part is made of metal or plastic material
- the coupling section comprises a locking section configured to receive a part of a housing of the optical system
- a footprint of at least one of the first part and the second part is circular, elliptical, triangular, rectangular or polygonal Considerable advantages are obtained by means of certain embodiments of the present invention. A system for protecting an optical system is provided. According to the present invention, contamination of the optical system can be eliminated or at least reduced. The incoming air can enter the system through the at least one opening in the outer hollow part of the system. Subsequently, at least a part of the air flow is guided between the inner surface of the outer hollow part and the outer surface of the inner hollow part. The air flow is then directed substantially downwards at the end of the inner hollow part. Thus, creation of a vortex within the inner hollow part can be avoided or at least the vorticity within the inner hollow part can be reduced. Therefore, also contamination of a window or lens of the optical system can be eliminated or at least reduced. Consequently, the inner hollow part of the system according to the present invention can be relatively short, and thus the system for protecting the optical system can be very compact.

According to certain embodiments of the present invention, the system comprises at least one protrusion in the form of a perimeter wall protruding from a cover having at least one opening into a cavity of the inner hollow profile. Both the cover and the at least one protrusion reduce the risk of contamination of the external optical system to be located on the other side of the cover. The cover reduces the exposed surface area of a lens or window of the optical system. The protrusion further prevents drops or liquids from entering the at least one opening through the cover, and thus further reduces the risk of contamination of the external optical system.

According to certain embodiments of the present invention, at least a part of the system is furthermore made of flexible material. Thus, the system can vibrate relatively heavily when being in use, for example when being attached to a moving vehicle. Particles, which are adhered to the system, for example to the hollow inner part and the cover, may be disengaged from the system due to the vibrations.

The system according to certain embodiments of the present invention also improves traffic safety due to maintaining accurate measurement results of a road condition, as the system reduces contamination of a window or lens of an optical road condition measurement system over time.

The system is further capable of being manufactured in industrial scale.

BRIEF DESCRIPTION OF THE DRAWINGS

For a more complete understanding of particular embodiments of the present invention and their advantages, reference is now made to the following descriptions, taken in conjunction with the accompanying drawings. In the drawings.

EMBODIMENTS

Figure 1:
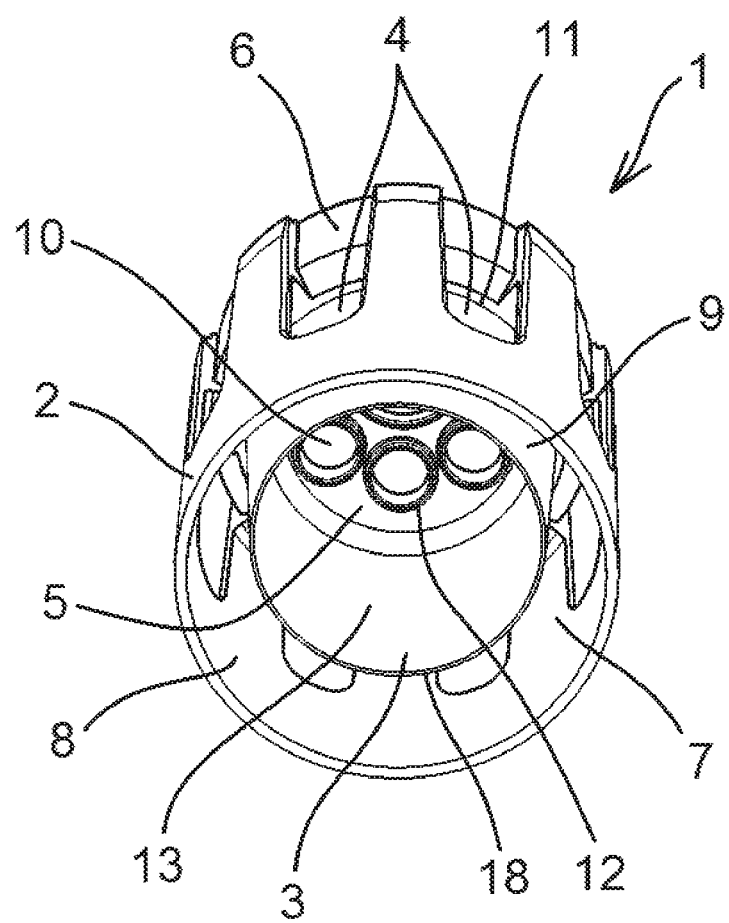
FIG. 1 illustrates a schematic perspective view of a system in accordance with at least some embodiments of the present invention.

In FIG. 1 a schematic perspective view of a system 1 in accordance with at least some embodiments of the present invention is illustrated. The system 1 comprises a hollow first part 2 having a plurality of first openings 4 and a hollow second part 3 arranged at least partially within the first part 2. The hollow first part 2, i.e. the outer part, and the hollow second part 3, i.e. the inner part, are connected to each other. In other words, a first end 11 of the second part 3 is connected to the first part 2. The first and second parts 2, 3 may be connected to each other via a further third part. In the shown embodiment, the third part is represented by a coupling section 6 which is configured to be coupled to an external optical system (not shown). The optical system may be, for example, arranged in a housing (not shown). Examples of an optical system are a camera and a measurement system such as a road condition monitoring system. The system 1 according to the present invention is configured to guide at least a part of an incoming air flow from at least one of the openings 4 along a flow channel 7 between an inner surface 8 of the first part 2 and an outer surface 9 of the second part 3. The incoming air flow may be e.g. caused by wind or by movement of the system 1, for example when being attached to a moving vehicle.

According to the present invention, contamination of the optical system can be eliminated or at least reduced. The incoming air can enter the system 1 through the first openings 4 in the outer hollow part 2. Subsequently, at least a part of the air flow is guided downwards between the inner surface 8 of the outer hollow part 2 and the outer surface 9 of the inner hollow part 3. The air flow is then orientated substantially downwards at the second end 18 of the inner hollow part 3. Thus, creation of a vortex within the cavity 13 of the inner hollow part 3 can be avoided or at least the vorticity within the cavity 13 of the inner hollow part 3 can be reduced. At best, there is at least temporarily no air flow within the cavity 13 of the inner hollow part 3 at all. Consequently, material particles cannot arrive at a window or lens of the optical system. The inner hollow part 3 can be therefore relatively short, and thus the system 1 for protecting the optical system can be very compact.

The second part 3 further comprises a cover 5 having four second openings 10. In the shown embodiment, three of the four second openings 10 are arranged for providing the capability of laser beams of an optical measurement system to pass the cover 5. A receiver (not shown) may be arranged behind the fourth of the four second openings 10. The cover 5 is arranged at the first end 11 of the second part 3. Of course, the cover 5 may also be a part of the coupling section 6. The cover 5 reduces the surface area, which is exposed to contamination, of a window or lens of the optical system.

In the shown embodiment, four protrusions 12 further extend from the cover 5 into the cavity 13 of the second part 3. The protrusions 12 are in the form of a perimeter wall around each of the four second openings 10, respectively. Drops or liquid flowing along the cover 5 therefore cannot enter the second openings 10. The protrusions also somewhat protect a window or lens of an optical system from droplets moving upwards in the air.

Figure 2:
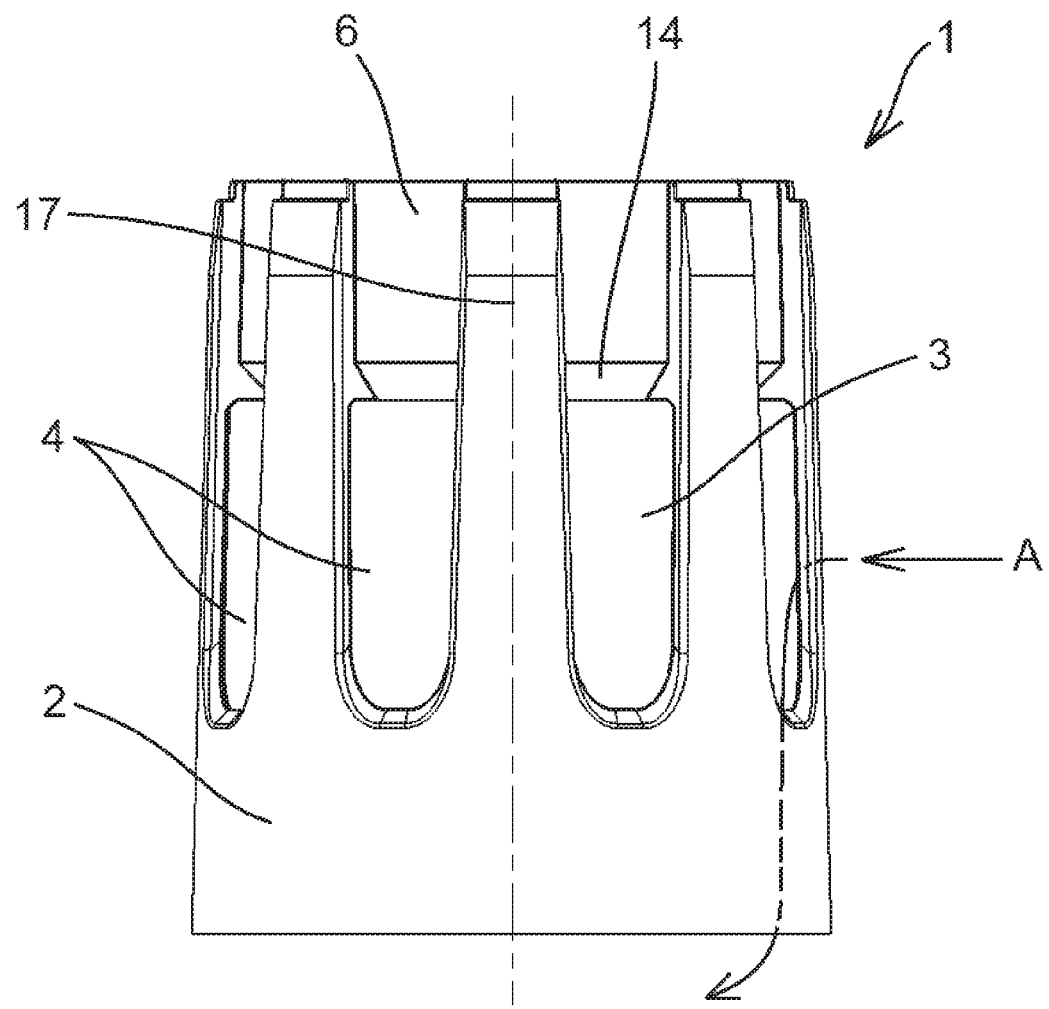
FIG. 2 illustrates a schematic side view of a system in accordance with at least some embodiments of the present invention.

In FIG. 2 a schematic side view of a system 1 in accordance with at least some embodiments of the present invention is illustrated. In use, the central axis 17 of the system 1 is typically orientated vertically or substantially vertically. The term "vertically" means vertically in the established sense of the word to refer to the normal of the Earth's surface. An incoming air flow A is typically orientated perpendicular or substantially perpendicular to the central axis 17. The incoming air flow may be e.g. caused by wind or by movement of the system 1. The system 1 may comprise a plurality of first openings 4 through the first part 2, for example eight first openings 4. The first openings 4 may be, for example, arranged circumferentially around the first part 2. The incoming air flow A can enter the system 1 through at least one of the first openings 4. Thus, the system 1 is always well positioned regardless of the direction of the incoming air flow A.

According to the shown embodiment, the second part 3, which is arranged within the first part 2, is shorter than the first part 2. The lower part of the first part 2 overlaps with a second end (not visible) of the second part 3. Consequently, the lower part of the first part 2 serves locally as some sort of flow protector from the incoming air flow A for the second part 3, particularly for the entrance into the second part 3. The coupling section 6 further comprises a wedge shaped portion 14 for each first opening 4. The wedge shaped portions 14 are dimensioned such that the incoming air flow A is directed downwards in the region of the first openings 4/coupling section 6. After having entered the system 1 through at least one first opening 4, the air flow A is at least partially guided downwards in a flow channel between the first part 2 and the second part 3. The velocity of the flow in the flow channel is less than the velocity of the incoming air flow A. The flow is directed substantially downwards at the second end (lower end) of the second part 3. The velocity of the flow at the second end (lower end) of the second part 3 is less than the velocity of the incoming air flow A. Thus, there is no substantial air flow present through the opening forming an entrance into the cavity of the second part 3. Creation of a vortex within the cavity of the second part 3 can be eliminated or at least the vorticity can be reduced. Therefore, also contamination of a window or lens of the optical system can be eliminated or at least reduced. Subsequently, the air flow can leave the system 1 at the end of the system 1, in particular at the lower end of the first part 2.

According to the present invention, the incoming air flow A is guided within the system 1 such that creation of a vortex within the cavity of the second part 3, which is typically in the form of a tube, can be avoided or such that the vorticity within the cavity of the second part 3 can be at least reduced. In other words, the incoming air flow A is used to reduce contamination of a window or lens of an optical system. No moving parts are comprised by the system 1. Especially, no moving parts are required for creating an air flow.

Figure 3:
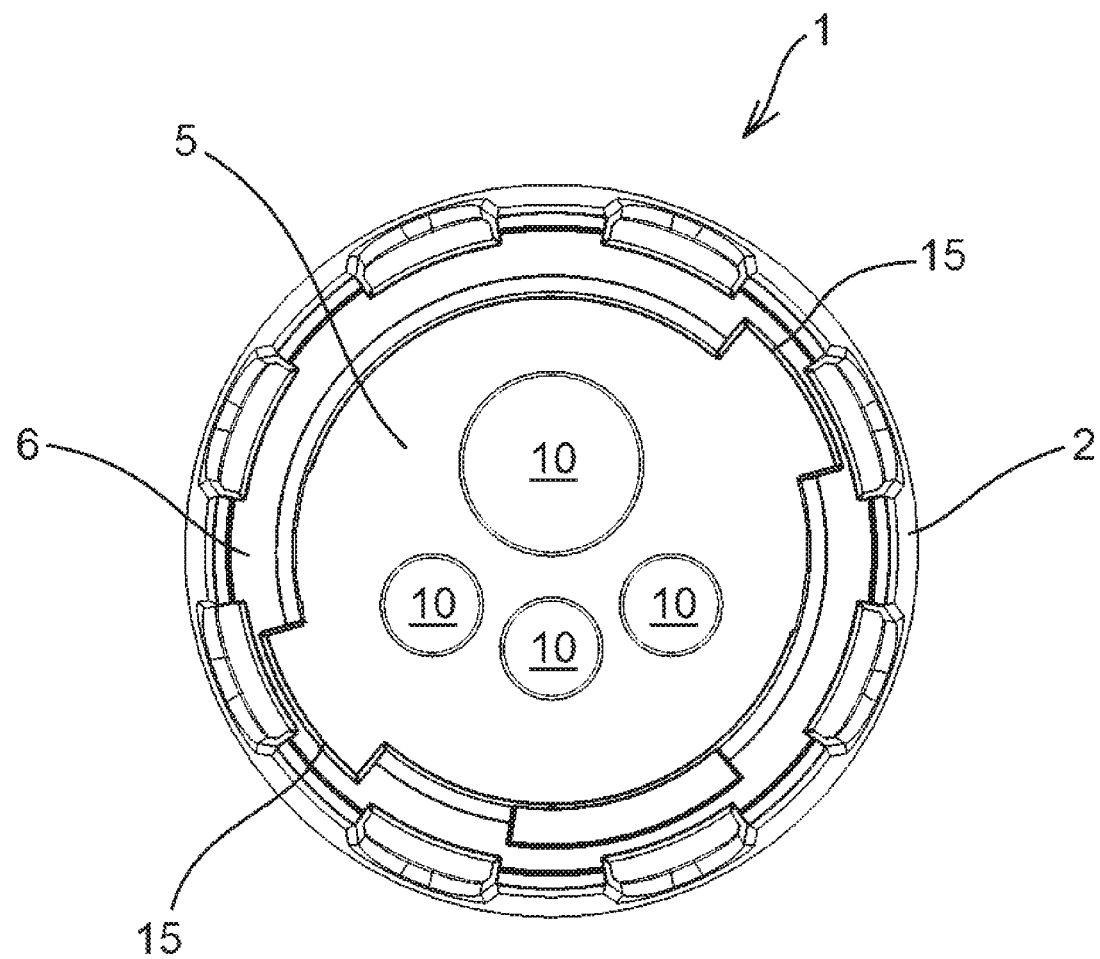
FIG. 3 illustrates a schematic top view of a system in accordance with at least some embodiments of the present invention.

In FIG. 3 a schematic top view of a system 1 in accordance with at least some embodiments of the present invention is illustrated. Four second openings 10 through the cover 5 of the system 1 are shown. The three second openings 10 are of identical size and shape. Each of the aforementioned three second openings 10 is arranged for transmission of a respective laser beam. The fourth of the second openings 10 is arranged for receiving an optical spectrum by a receiver of an optical measurement system. Of course, other embodiments may comprise only one second opening or any other integer number of second openings. The size and shape of the second openings 10 may be identical or different. The shape of the second openings 10 may be, for example, circular, elliptical, triangular, rectangular or polygonal.

Figure 5:
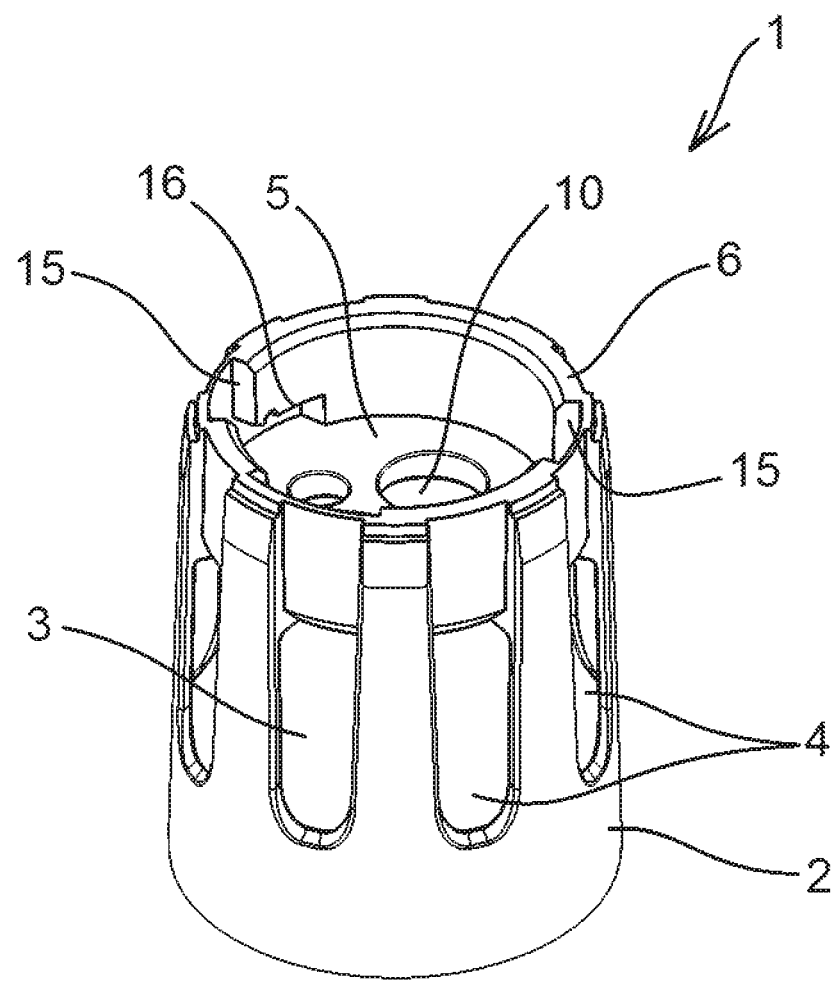
FIG. 5 illustrates another schematic perspective view of a system in accordance with at least some embodiments of the present invention.
Figure 8:
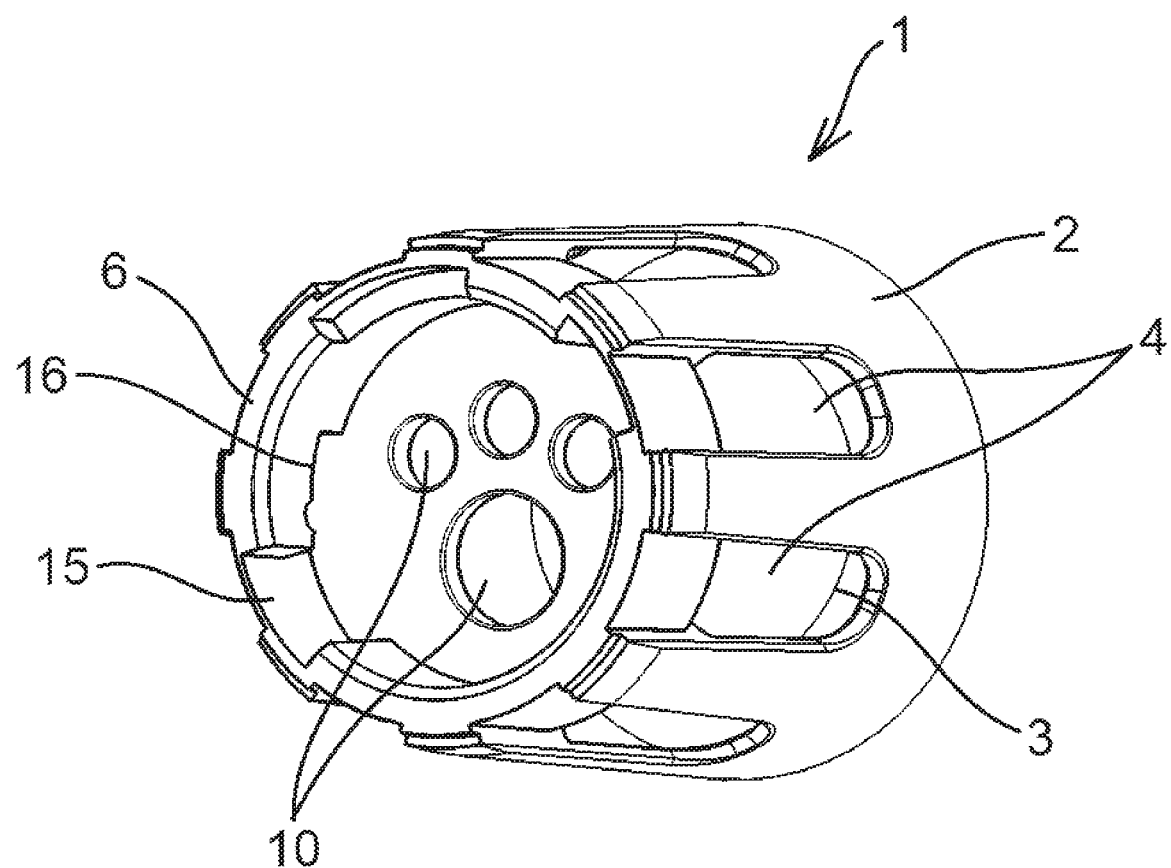
FIG. 8 illustrates an even further schematic perspective view of a system in accordance with at least some embodiments of the present invention.

Additionally, a coupling section 6 comprising two indentations 15 is illustrated. The indentations 15 are configured to interact with respective counterparts comprised by a housing of the external optical measurement system. In other words, parts of the housing of the external optical system can be inserted into the indentations 15. Of course, the coupling section 6 may comprise any other integer number of indentations 15. Also the shape and size of the indentations may differ from the shown indentations 15. Of course, also other systems for coupling an external optical system to the coupling section 6 of the system 1 may be used. In FIG. 5 and FIG. 8 a locking system comprised by the coupling section 6 is additionally shown.

Figure 4:
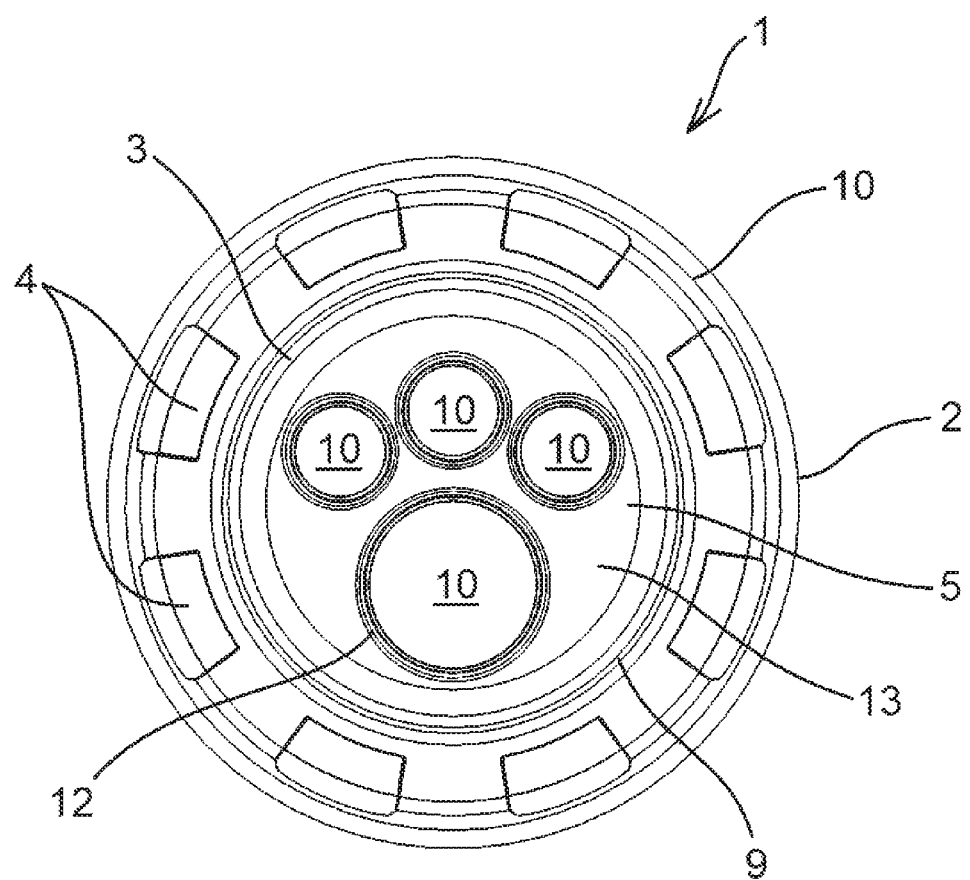
FIG. 4 illustrates a schematic bottom view of a system in accordance with at least some embodiments of the present invention.

In FIG. 4 a schematic bottom view of a system 1 in accordance with at least some embodiments of the present invention is illustrated. Four first openings 10 through the cover 5 of the system 1 are shown. Additionally, four corresponding protrusions 12 in the form of perimeter walls extend from the cover 5 into the cavity 13 of the second part 3. The protrusions 12 and the cover 5 may be made of one single piece, for instance. Alternatively, the protrusions 12 may be attached to the cover 5, for example O-shaped rings may be attached to the cover 5 by use of adhesive. The protrusions 12 and the cover 5 may be of identical or different material.

Generally, the function of the protrusions 12 is to prevent drops or liquid from flowing along the cover 5 into the at least one second opening 10, and thus prevent contamination of a window or lens of an optical system positioned behind the cover 5. The protrusions 12 may also somewhat protect a window or lens of an optical system from droplets moving upwards in the air through the cavity 13 of the second part 3. Other words for such protrusions may be a seal, a lip or a sealing lip, for instance.

In FIG. 5 another schematic perspective view of a system 1 in accordance with at least some embodiments of the present invention is illustrated. According to the shown embodiment, the system 1 comprises a first part 2, a second part 3 and a third part in the form of a coupling section 6. All parts 2, 3, 6 are made from one single piece. Example materials of the system 1 are TPU or TPE.

The coupling section 6 comprises two indentations 15, wherein each indentation 15 is configured to receive a corresponding part of a housing of an optical system. Additionally, a locking section 16 adjacent to each indentation 15 is comprised by the coupling section 6. The locking section may comprise a bayonet catch, for instance. Thus, parts of the housing of the optical system can be inserted into the indentations 15 and subsequently the system 1 and the external optical system can be temporarily connected to each other by rotating the system 1 and the optical system relative to each other into a locked position. Subsequently, the system 1 according to the present invention and the external optical system are coupled to each other and ready for use. Of course, the system 1 and the external optical system can be separated from each other, for example in order to clean the window or optical lens of the external optical system.

Figure 6:
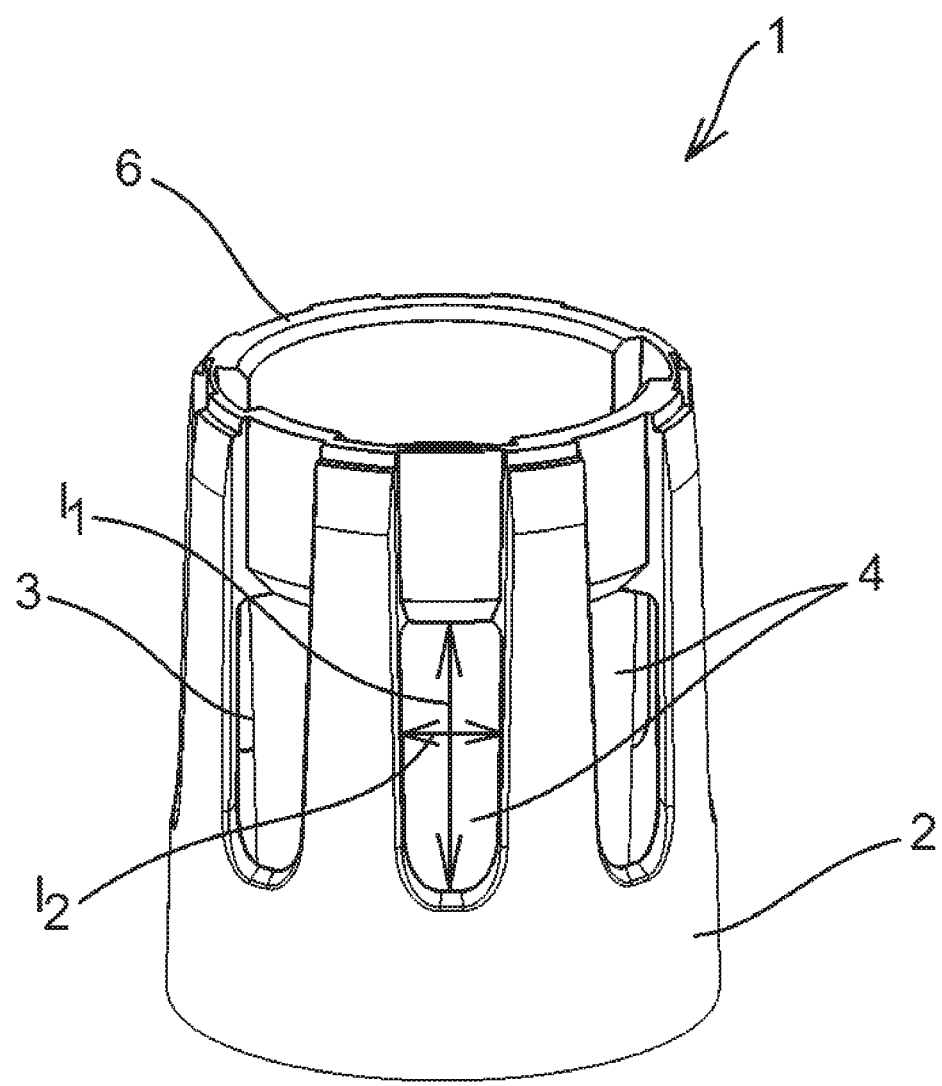
FIG. 6 illustrates a further schematic perspective view of a system in accordance with at least some embodiments of the present invention.

In FIG. 6 a further schematic perspective view of a system 1 in accordance with at least some embodiments of the present invention is illustrated. The first part 2 comprises a plurality of first openings 4. The first openings 4 may be substantially of rectangular or elliptical shape, for instance. In the shown embodiment, a first (maximum) length $l_1$ of a first opening 4 is in the range between 40 mm-80 mm, for example about 55 mm. A second (maximum) length $l_2$ is in the range between 10 mm-30 mm, for example about 20 mm. The first length $l_1$ is arranged parallel or substantially parallel to the central axis of the system 1. The second length $l_2$, i.e. a (maximum) width of the respective first opening 4, is perpendicular to the first length $l_1$. Of course, the present invention is not limited to the aforementioned dimensions. Other embodiments may have at least one first opening 4 having a different shape or having other dimensions. However, the at least one first opening 4 is designed to provide an entry into the system 1 for an incoming air flow. At least a part of the air flow is then guided from the entry along a flow channel formed between the first part 2 and the second part 3 of the system 1.

Figure 7:
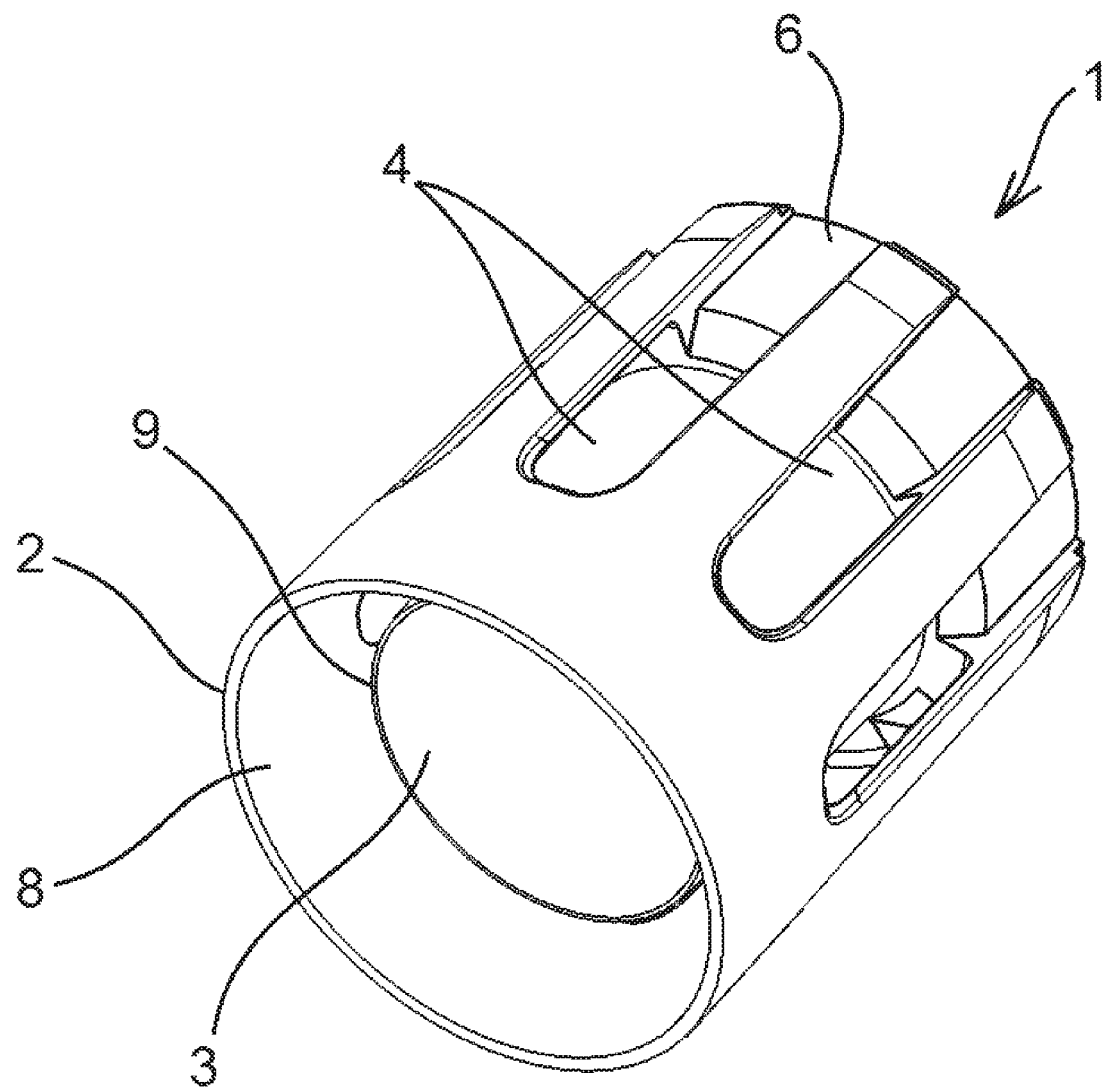
FIG. 7 illustrates a yet further schematic perspective view of a system in accordance with at least some embodiments of the present invention.

In FIG. 7 a yet further schematic perspective view of a system 1 in accordance with at least some embodiments of the present invention is illustrated. As can be seen, the first part 2 and the second part 3 are both in the form of a tube. A length of the first part 2 is greater than a length of the second part 3. In other words, the second part 3 having a diameter, which is smaller than a diameter of the first part 2, is completely arranged within the first part 2. According to certain embodiments, the first part 2, the second part 3, and the third part, i.e. the coupling section 6, are formed from one single piece. According to certain other embodiments, the system 1 is made from several pieces which are fixedly attached to each other. For example, the first part 2 and the second part 3 may each be a metal tube. Both the first part 2 and the second part 3 may be attached to the coupling section 6 in order to form the system 1. Both the first part 2 and the second part 3 may be tubes made from metal or plastic material, for instance.

In FIG. 8 an even further schematic perspective view of a system 1 in accordance with at least some embodiments of the present invention is illustrated.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in protection of an optical road condition measurement system.

ACRONYMS

TPE thermoplastic elastomer
TPU thermoplastic polyurethane

REFERENCE SIGNS LIST

1 system
2 first part
3 second part
4 first opening
5 cover
6 coupling section
7 flow channel
8 inner surface of first part
9 outer surface of second part
10 second opening
11 first end of second part
12 protrusion
13 cavity
14 wedge shaped portion
15 indentation
16 locking section
17 central axis
$l_1$ length of first opening
$l_2$ width of first opening

The invention claimed is:

1. A system for protecting an optical road condition monitoring system from contamination, the system comprising:
   a hollow first part in the form of a first tube having a plurality of first openings, each of the first openings having a closed perimeter,
   a hollow second part in the form of a second tube arranged at least partially within the first part, the second part protruding at a first end from a cover extending to the first part, and
   a coupling section configured to be coupled to the optical road condition monitoring system,
   wherein the system is configured to guide at least a part of an incoming air flow from the plurality of first openings along a flow channel between an inner surface of the first part and an outer surface of the second part into a direction away from the coupling section towards a ring-like flow outlet formed between the first part and a second end of the second part in order to protect the optical road condition monitoring system from contamination, and
   wherein the system is made of thermoplastic polyurethane or thermoplastic elastomers in order to cause the system to vibrate when being attached to a moving vehicle.

2. The system according to claim 1, wherein a length of the first part is greater than a length of the second part.

3. The system according to claim 1, wherein a first end of the second part is connected to the first part.

4. The system according to claim 1, wherein a second end of the second part is arranged at a different level than an end of the first part.

5. The system according to claim 1, wherein the cover has at least one second opening.

6. The system according to claim 5, wherein at least one protrusion extends from the cover into a cavity of the second part.

7. The system according to claim 1, wherein each of the first openings has a length in the range between 40 mm-80 mm.

8. The system according to claim 1, wherein each of the first openings has a width in the range between 10 mm-30 mm.

9. The system according to claim 1, wherein the system is made from one single piece.

10. The system according to claim 1, wherein the coupling section comprises a locking section configured to receive a part of a housing of the optical road condition monitoring system.

11. The system according to claim 1, wherein a footprint of at least one of the first part and the second part is circular, elliptical, triangular, rectangular or polygonal.

* * * * *